United States Patent [19]

Bélanger

[11] Patent Number: 4,813,526
[45] Date of Patent: Mar. 21, 1989

[54] CONVEYOR

[75] Inventor: Bernard Bélanger, La Pocatière, Canada

[73] Assignee: Entrepreises Premier CDN Ltee., Quebec, Canada

[21] Appl. No.: 113,502

[22] Filed: Oct. 28, 1987

[30] Foreign Application Priority Data

Nov. 3, 1986 [CA] Canada ................................ 522083

[51] Int. Cl.[4] ............................................. B65G 15/26
[52] U.S. Cl. .................................... 198/313; 198/314; 198/317; 198/588; 198/589
[58] Field of Search ................ 198/304, 306, 313–318, 198/587–589, 592, 594; 414/398

[56] References Cited

U.S. PATENT DOCUMENTS

| 2,138,200 | 11/1938 | Whitmire | 198/317 |
| 2,805,759 | 9/1957 | Manceau | 198/314 |
| 3,717,263 | 2/1973 | McWilliams | 198/317 |
| 3,825,107 | 7/1974 | Cary et al. | 198/313 |
| 3,826,353 | 7/1974 | Greasley | 198/313 |

Primary Examiner—Joseph E. Valenza
Attorney, Agent, or Firm—Charles E. Brown; Charles A. Brown

[57] ABSTRACT

A mobile conveyor unit having first and second conveyors mounted on a drivable, wheeled chassis in back-to-back relation. At least one of the conveyors in the unit can be raised or lowered, extended or retracted, and swung laterally to increase the range of the conveyor. An operating station is provided on the chassis to control the operation of the chassis and the two conveyors. A second operating station is provided at the outer end of the one conveyor to also control the operation of the one conveyor.

12 Claims, 4 Drawing Sheets

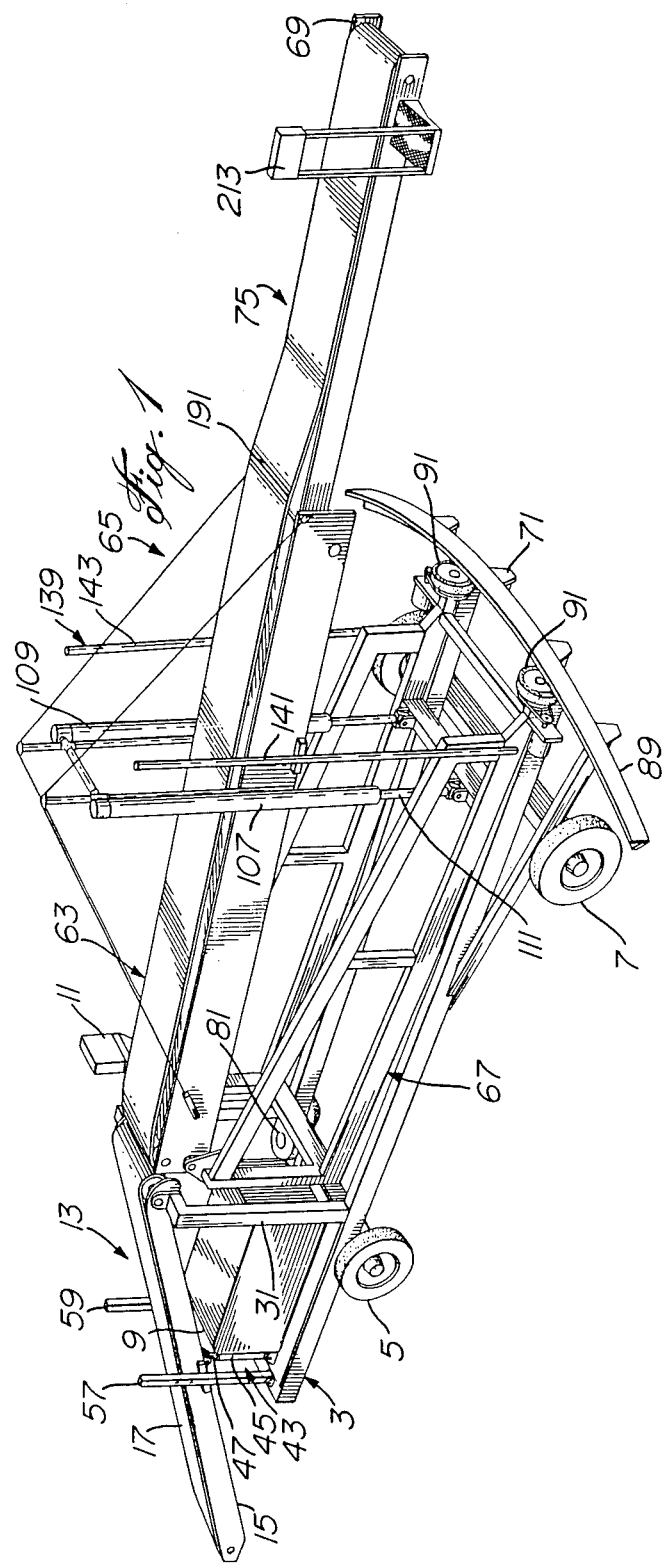

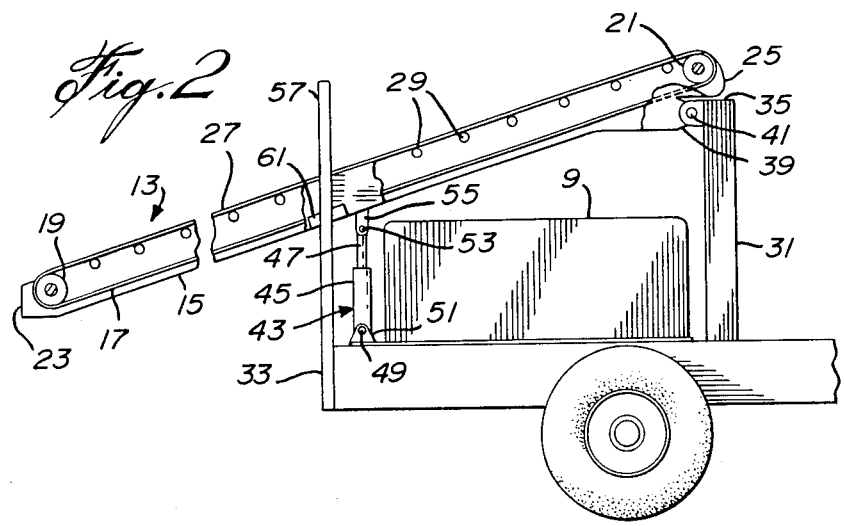
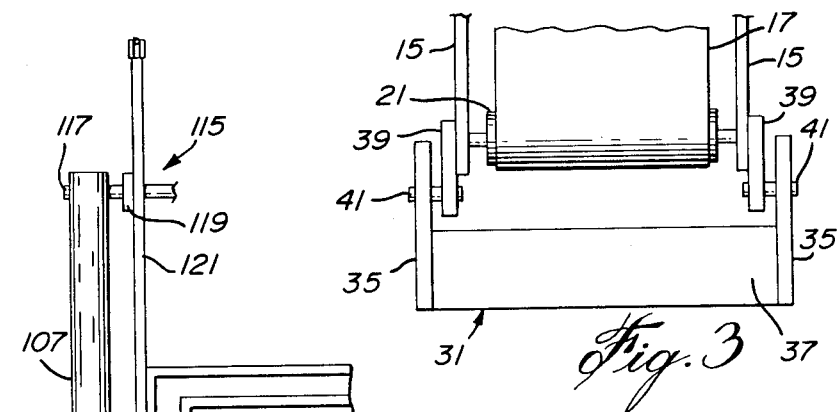
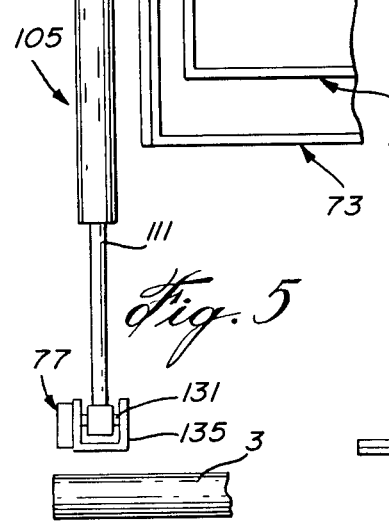
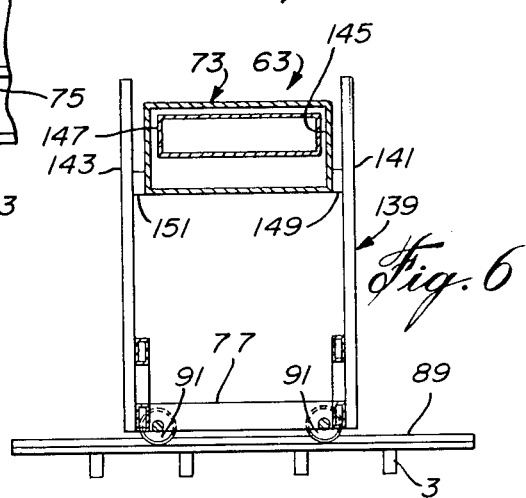

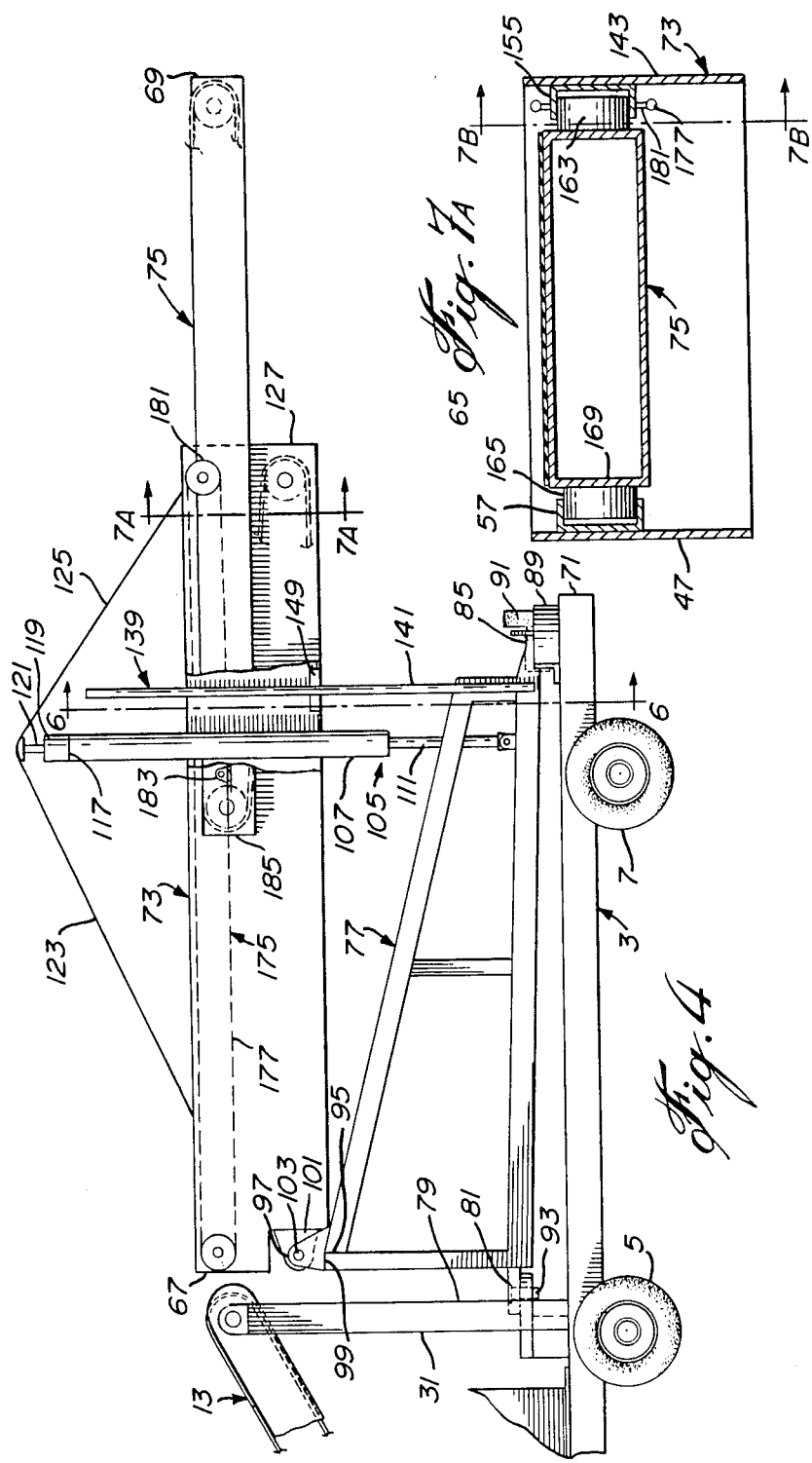

CONVEYOR

BACKGROUND OF THE INVENTION

This invention is directed toward an improved mobile conveyor unit.

Mobile conveyor units for loading or unloading goods are well known. However the known conveyor units do not have sufficient flexibility for many of the jobs they are used for. By flexibility, it is meant the ability to deliver the goods being handled to changing unloading points without having to move the conveyor unit.

Many conveyor units are known that have a conveyor that can be raised or lowered to change the location of the unloading end of the conveyor vertically. Conveyor units are also known which have conveyors that can be extended or retracted to change the location of the unloading end of the conveyor longitudinally. There are also known conveyor units having conveyors which combine both features such as that shown in U.S. Pat. No. 3,826,353 by way of example. However, even these combined conveyor units must be frequently shut down and moved to a new position when in use to accomodate the growing pile of goods delivered by the conveyor unit.

Another problem with known conveyor units resides in the time required to adjust the conveyor unleading end to a new position. This is normally done from the ground and often requires a second operator at the unloading end of the conveyor shouting instructions to the operator on the ground as to how to reposition the unloading end. Because of the different interpretations given to the instructions, it can take some time before the conveyor is properly positioned.

SUMMARY OF THE INVENTION

It is the purpose of the present invention to provide a mobile conveyor unit that has more flexibility than known conveyor units. Thus the conveyor unit will not require frequent repositioning and will be more efficient in operation.

It is another purpose of the present invention to provide a mobile conveyor unit that can be controlled from the unloading end thus making it much more efficient in operation.

In accordance with the present invention there is provided a mobile conveyor unit having a driveable chassis with two conveyors mounted thereon in back-to-back relation. The conveyor unit can be driven to the work location and properly positioned there by manoeuvering the chassis. Once in place, the two conveyors on the unit are used to transport goods between two locations. At least one of the conveyors can be moved up and down, and extended or retracted, so as to change the location of its free end thus changing the loading-unloading location. In addition, this one conveyor can also be swung laterally to provide another dimension to locating its free end and thus greatly increasing its efficiency. With the ability to swing the conveyor laterally, the unit need not be shut down as often to reposition it.

In addition, means are provided at the free end of the one conveyor for controlling its position. Thus an operator, working at the free end of this conveyor to load or unload goods onto or from it, can quickly raise or lower, extend or retract, or laterally swing the conveyor to suit changing working conditions and thus obtain more efficient operation.

The invention is particularly directed toward a mobile conveyor unit having a wheeled chassis and a first conveyor having longitudinally spaced-apart ends. Means are provided for mounting the first conveyor, at one end, on the chassis. The first conveyor extends away from the chassis to have its other end clear of the chassis. A second conveyor is provided also having longitudinally spaced-apart ends. Means are provided for mounting the first conveyor, at one end, on the chassis. The first conveyor extends away from the chassis to have its other end clear of the chassis. A second conveyor is provided also having logitudinally spaced-apart ends. Means are provided for mounting the second conveyor, at one end, on the chassis with the one end located adjacent the one end of the first conveyor so that goods can be transferred between the conveyors. The second conveyor extends from the chassis in a direction away from the first conveyor to have its other end clear of the chassis. Means are provided for raising and lowering the second conveyor about its one end, and means are provided for swinging the second conveyor laterally about its one end.

The second conveyor preferably has a first section, and a second section slidably mounted within the first section, and movable out of the first section to extend the second conveyor.

An operator's station is mounted on the other end of the second conveyor on the second section.

BRIEF DESCRIPTION OF THE DRAWINGS

FIG. 1 is a perspective view of the mobile conveyor;

FIG. 2 is a side detail view of the first conveyor;

FIG. 3 is a top detail view of the connection of the first conveyor to the chassis;

FIG. 4 is a side detail view of the second conveyor and the movable support frame;

FIG. 5 is a detail view showing the mounting of the second conveyor lifting means;

FIG. 6 is a cross-section view taken along line 6—6 in FIG. 4;

FIG. 7A is a detail cross-section view of the second conveyor taken along line 7A—7A in FIG. 4;

DETAILED DESCRIPTION OF THE INVENTION

Figure 8A:
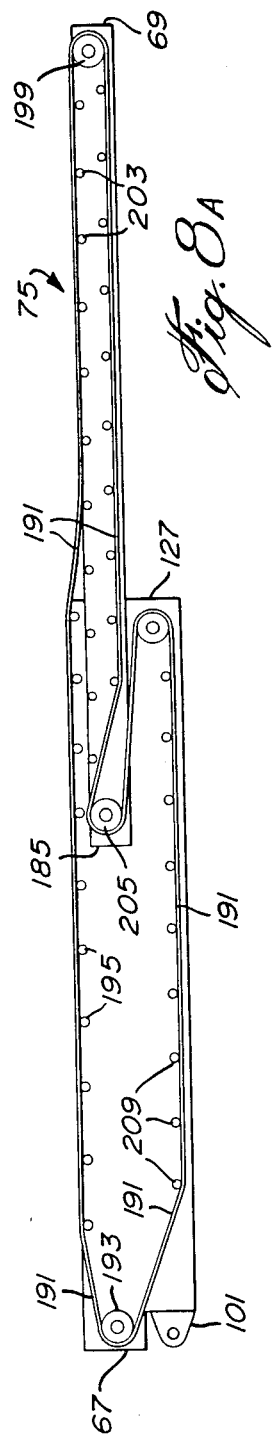
FIG. 8A is a schematic view of the second conveyor in an extended position.

The mobile conveyor unit 1 of the present invention, as shown in Fig. I, has a chassis 3 mounted on front and rear pairs of wheels 5, 7. The rear pair of wheels 5 is driven via suitable drive means (not shown), by a motor 9 mounted at the rear of the chassis 3. At least the front pair of wheels 7 can be steered by suitable steering means (not shown) from an operator's station located at one side, and to the rear, of the chassis 3. The mobile conveyor unit 1 can thus be easily moved to the desired operating location.

A first conveyor 13 is mounted on the chassis 3 of the conveyor unit 1. The first conveyor 13, as shown in FIG. 2, has an elongated, tubular frame 15. An endless conveyor belt 17 is mounted over rollers 19, 21 located at the ends 23, 25 of the frame 15. One of the end rollers 19, 21 is driven by motor means (not shown) to move the belt 17 over the rollers so that its upper run 27 can carry goods from the outer end 23 of the conveyor to its inner end 25. A plurality of idler rollers 29 are mounted on the frame 15 to support the belt 17, particularly the upper run 27 of the belt, between the end rollers 19, 21.

The first conveyor 13 is pivotally mounted at its inner end 25 to an upright, fixed support frame 31. The upright support frame 31 is fixedly mounted to the chassis 3 near its rear end 33 and carries a pair of horizontally spaced-apart mounting brackets 35 at its upper end 37 as shown in FIG. 3. A pair of mounting brackets 39 is provided on the frame 15 of the first conveyor 13 adjacent its inner end 25. The brackets 39 are located under the guide roller 21. Horizontal mounting pins 41 pass through brackets 35, 39 to pivotally connect the first conveyor 13 to the support frame 31. The first conveyor 13 is also supported on the chassis 3 by a pair of movable, rigid, supports 43. Each support 43 preferably comprises a hydraulic actuator 45 having a projecting piston rod 47. The actuator 45 is pivotally mounted via a pivot pin 49 to a bracket 51 fixed to the chassis 3 at its rear end 33. The projecting piston rod 47 is pivotally mounted, via a pivot pin 53 to a bracket 55 fixed to the bottom of the conveyor frame 15 at a point spaced from its inner end 25. The piston rods 47 of the actuators 45 can be extended or withdrawn to raise or lower the first conveyor 13 about the horizontal mounting pin 41. Thus the height of the outer end 23 of the first conveyor 13 can be adjusted to locate it in the desired working position.

A pair of rigid, rear guide members 57, 59 is mounted on the end 33 of the chassis 3 and extends upwardly, one on each side of the first conveyor 13. The guide members 57, 59 can be braced to the support frame 31 if needed. The guide members 57, 59 lie closely adjacent to wear bars 61 mounted on the sides of the frame 15 of the first conveyor 13. The rear guide members 57, 59 guide the first conveyor 13 during its up and down movement, and serve to steady it in its selected position.

A second conveyor 65 is mounted on the chassis 3 of the conveyor unit 1 in a position to cooperate with the first conveyor 13. The second conveyor 65 has an inner end 67 located adjacent the inner end 25 of the first conveyor 13 as shown in FIG. 4. The second conveyor 65 extends forwardly of the chassis 3 to have its outer end 69 well clear of the front end 71 of the chassis. The second conveyor 65 has two, tubular frames 73, 75. The tubular frame 75 is telescopically mounted within the tubular frame 73.

The first, larger conveyor frame 73 is pivotally mounted at its inner end 67 to a horizontally extending, movable, support frame 77. The movable support frame 77 has an inner end 79 located adjacent the upright fixed support frame 31. A socket 81 is centrally located at the bottom, inner end 79 of the frame 77. The support frame 77 is pivotally mounted, via the socket 81, to a vertical pivot pin 83 centrally fixed to the chassis 3 adjacent support frame 31. The support frame 77 can swing horizontally about the pivot pin 83. The front end 85 of the movable support frame 77 is guided for movement along a curved support track 89 mounted on the chassis 3 at its front end 71. The track 89 is preferably part-circular in shape with its center of curvature located at the vertical axis of the pivot pin 83. The track 89 extends well past each side of the chassis 3. A pair of wheels 91 is rotatably mounted on the front end 85 of the frame 77. At least one of the wheels 91 can be driven by a motor (not shown) to move the movable support frame 77 horizontally along the track 89 about the pivot 83. As the support frame 77 swings horizontally about the pivot 83, so does the second conveyor 65 that it carries.

The movable support frame 77 carries an upright support 95 at its inner end 79. A pair of horizontally spaced-apart brackets 97 is mounted on the upright support 95 at its upper end 99. The second conveyor 65 has a pair of brackets 101 at its inner end 67 on the first tubular frame 73. A horizontal pivot pin 103 connects the brackets 97, 101 together thereby pivotally connecting the second conveyor 65 to the movable support frame 77. The second conveyor 65 can swing up and down about pivot pin 103 relative to the movable support frame 77.

Means 105 are provided for moving the second conveyor 65 up and down about its inner end 67. These moving means 105 can comprise a pair of hydraulic actuators 107, 109 each having a projecting piston rod 113. One actuator 107 is vertically located on one side of the first frame 73 of the second conveyor near its mid-point and the other actuator 109 is vertically located on the other side of the first frame 73. Means 115 are provided for pivotally mounting each of the actuators 107, 109 to the sides of the first frame 73. The mounting means 115, as shown in FIG. 5, can comprise a pivot pin 117 extending laterally from the actuator 107 and rotatably mounted in a bracked 119 fixed to the frame 73. The bracket 119 is fixed to the top of a post 121 extending up from the side of the frame 73 at about its center. The post 121 anchors tensioning members 123, 125 extending up to the top of the post from the ends 67, 127 respectively of the frame 73. Actuator 109 is attached to the other side of the frame in a similar manner. Means 129 are also provided for pivotally mounting each of the actuators 107, 109 to the support frame 77. The mounting means 129 comprise a pivot pin 131 which connects the piston rod 111 of actuator 107 to a bracket 135 on the side of the movable support frame 77. Actuator 109 is mounted in a similar manner to the other side of the support frame 77. When the actuators 107, 109 are operated, the second conveyor 65 is raised or lowered on the movable support frame 77.

Means 139 are provided for guiding the second conveyor 65 during its up and down movement. The guiding means comprise a pair of rigid front guide members 141, 143 fixed to the front end 85 of the movable frame 77 and extending upwardly about the second conveyor 65 adjacent the sides 145, 147 of the first frame 73 as shown in FIGS. 4 and 6. Wear bars 149, 151 on the bottom of the sides 145, 147 of the first frame 73 guide the second conveyor 65 between the guide members 141, 143 during its up and down movement. The guide members 141, 143 also serve to steady the second conveyor 65.

Figure 7B:
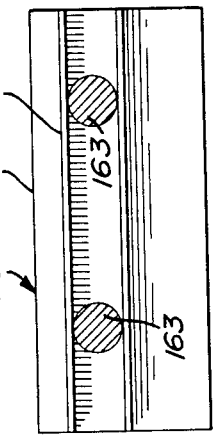
FIG. 7B is a detail cross-section view of the second conveyor taken along line 7B–7B in FIG. 7A.

The second conveyor 65 has the first, elongated, tubular frame 73 mounted on the movable support frame 77 via the pivot pin 103 and the hydraulic actuators 107, 109. The second elongated, tubular frame 75 is slidably mounted within the first frame 73 by means of a pair of guide channels 155, 157 fixed to the inner surfaces of the side walls 145, 147 of the first frame 73 as shown in FIGS. 7A and 7B. A pair of longitudinally spaced-apart, outwardly projecting guide members 163, 165 is provided on each side wall 167, 169 of the second frame 75 near its inner end 171. The guide members 163, 165 slide in the guide channels 155, 157 to slidably mount the second frame 75 within the first frame 73.

Means 175 are provided for moving the second frame 75 relative to the first frame 73. These moving means 175, as shown in FIG. 4, can comprise an endless chain 177 running between a first sprocket wheel 179 fixed to the first frame 73 at its rear end 67 and a second sprocket wheel 181 fixed to the first frame 73 at its front end 127. The chain 177 is linked on a bracket 183 fixed to the side wall 167 of the second frame 75 near its inner end 185. Motor means (not shown) operate one of the sprocket wheels 179, When the one sprocket wheel is operated, the chain drive moves the second frame 75 relative to the first frame 65 along the guide channels 155, 157.

Figure 8B:
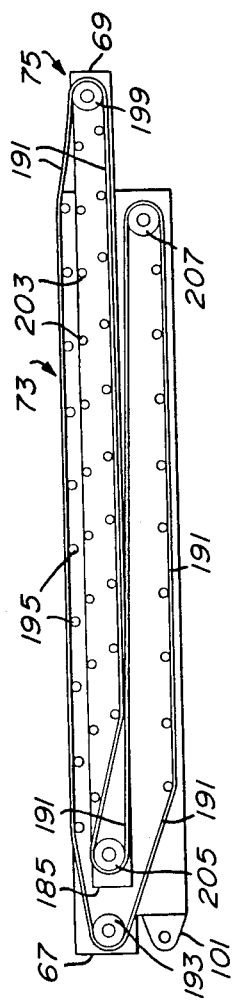
FIG. 8B is a schematic view of the second conveyor in a retracted position.

An endless conveyor belt 191 is provided on the second conveyor 65. The belt 191 passes over a first roller 193 on the inner end 67 of the first frame 73 and along the top of the first frame 73 over carrying rollers 195 as shown in FIGS. 8A and 8B. At the outer end 127 of the first frame 73 the belt 191 drops down onto the top of the projecting portion of the second frame 75 running to a second roller 199 at the outer end 69 of the second frame 75 while passing over carrying rollers 203. From the second roller 199, the belt 191 passes back under the second frame 75 to a third roller 205 mounted at the rear end 185 of the second frame 75. From the third roller 205, the belt passes over a fourth roller 207 mounted at the bottom of the front end 127 of the first frame 73. From fourth roller 207 the belt passes back along the bottom of the first frame 73 to the first roller 193 via any necessary returning rollers 209. At least one of the main rollers 193, 199, 205, 207 is driven by a motor (not shown) to drive the belt 191.

A second operator's station 213 is provided at the outer end of the second frame 73 of the second conveyor 65. The second station 213 is mounted from the side of the second frame 75 and carries controls allowing an operator at this station to laterally swing, raise or lower, and shorten or lengthen the second conveyor 65 as required. This feature is particularly useful piling goods, such as bags of peat, in a huge pile. As the height, the depth and the width of the pile slowly changes, the operator doing the actual piling of the goods delivered by the second conveyor, can keep repositioning the delivery end 69 of the second conveyor in the most convenient unloading positions from the second station 213. Either conveyor 13, 65 can be operated from the first operator's station Station 213 however operates the second conveyor only.

The conveyors 13, 65 can of course be operated in either direction. It is also contemplated that the first conveyor 13 could also be made in two frame sections, with one frame section slidable within the other frame section so that the conveyor 13 could be extended in a similar manner to the second conveyor 65. A third operator's station could be provided at the outer end 23 of the first conveyor 13 to raise or lower it, or to extend or retract it if the conveyor is made in two sections. The main operator's station 11 only is used to drive the mobile conveyor unit to or from a job site and to reposition the conveyor unit at the job site.

The embodiments of the invention in which an exclusive property or privilege is claimed are defined as follows:

1. A mobile conveyor unit having: a wheeled, elongated chassis having longitudinally spaced-apart ends; an elongated moving frame having longitudinally spaced-apart ends; pivot means pivotally mounting one end of the moving frame to the chassis near one end of the chassis for swinging movement about a vertical axis; means on the other end of the moving frame for guiding it on the other end of the chassis during swinging movement; a first conveyor having longitudinally spaced-apart ends, means mounting the first conveyor at one end onto the chassis adjacent the vertical axis, the first conveyor extending off the chassis over the one end of the chassis; a second conveyor having longitudinally spaced-apart ends, means pivotally mounting one end of the second conveyor on the moving frame, the one end of the second conveyor located over the vertical axis of the pivot means and adjacent the one end of the first conveyor, the second conveyor extending from the moving frame in a direction away from the first conveyor to have its other end clear the other end of the moving frame and the other end of the chassis; generally vertical moving means on the moving frame near its other end and connected to the second conveyor near its other end to raise and lower the second conveyor about its one end; and means for swinging the moving frame and thus the second conveyor about its pivot means on the chassis.

2. A mobile conveyor unit as claimed in claim 1 wherein the second conveyor has a first section, and a second section telescopically mounted within the first section and movable to extend or retract the second conveyor.

3. A mobile conveyor unit as claimed in claim 1 wherein the means guiding the moving frame on the chassis comprise a part-circular track mounted on the chassis, the center of curvature of the track located at the vertical axis, and a pair of wheels on the other end of the moving frame running on the track.

4. A mobile conveyor unit as claimed in claim 3 including means for rotating one of the wheels to move the moving frame along the track and to thus laterally swing the second conveyor.

5. A mobile conveyor unit as claimed in claim 2 including means mounted on the chassis for raising or lowering the first conveyor about its one end.

6. A mobile conveyor unit as claimed in claim 2 including a first operator's station on the chassis adjacent the one ends of the first and second conveyors, the first station controlling operation of the chassis and the first and second conveyors.

7. A mobile conveyor unit as claimed in claim 6 including a second operator's station on the other end of the second conveyor on the second section, the second station controlling operation of the second conveyor only.

8. A mobile conveyor unit as claimed in claim 2 wherein the first conveyor comprises an elongate, tubular frame and an endless belt mounted over rollers carried by the frame.

9. A mobile conveyor unit as claimed in claim 2 wherein the first section of the second conveyor comprise an elongate, tubular frame, the second section of the second conveyor comprises an elongate, tubular frame slidably mounted within the first section frame, the second conveyor including an endless belt mounted over rollers on the ends of both section frames in a manner allowing the second section frame to move relative to the first section frame.

10. A mobile conveyor unit as claimed in claim 9 including means on the first section frame for moving the second section frame.

11. A mobile conveyor unit having: a wheeled chassis; a moving frame mounted on the chassis; the moving frame having longitudinally spaced-apart ends, means pivotally mounting one end of the moving frame on the chassis for swinging movement about a vertical axis, guide means on the other end of the moving frame for guiding it on the chassis during swinging movement; the guide means comprising a part-circular track mounted on the chassis, the center of curvature of the track located at the vertical axis, and a pair of wheels on the other end of the moving frame running on track; a first conveyor having longitudinally spaced-apart ends, means mounting the first conveyor at one end on the chassis, the first conveyor extending from the chassis to have its other end clear of the chassis; a second conveyor having longitudinally spaced-apart ends, means mounting the second conveyor at one end on the moving frame, the one end of the second conveyor located above the vertical axis and adjacent the one end of the first conveyor so that goods can be transferred between the conveyors, the second conveyor extending from the chassis in a direction away from the first conveyor to have its other end clear of the chassis; the second conveyor having a first section and a second section telescopically mounted within the first section and movable to extend or retract the second conveyor; means for raising or lowering the second conveyor about its one end; and means for rotating one of the wheels on the moving frame to move the moving frame along the track and to thus laterally swing the second conveyor about its one end.

12. A mobile conveyor unit having: a wheeled chassis; a first conveyor having longitudinally spaced-apart ends, means mounting the first conveyor at one end on the chassis, the first conveyor extending from the chassis to have its other end clear of the chassis; a second conveyor having longitudinally spaced-apart ends, means mounting the second conveyor at one end on the chassis, the one end of the second conveyor located adjacent the one end of the first conveyor so that goods can be transferred between the conveyors, the second conveyor extending from the chassis in a direction away from the first conveyor to have its other end clear of the chassis, the second conveyor having a first section and a second section telescopically mounted within the first section and movable to extend or retract the second conveyor; means for raising or lowering the second conveyor about its one end; means for swinging the second conveyor laterally about its one end; a first operator's station on the chassis adjacent the one ends of the first and second conveyors, the first station controlling operation of the chassis and the first and second conveyors; and a second operator's station on the other end of the second conveyor on the second section, the second station controlling operation of the second conveyor only.

* * * * *